US009171075B2

(12) United States Patent
Millar et al.

(10) Patent No.: US 9,171,075 B2
(45) Date of Patent: Oct. 27, 2015

(54) SEARCHING RECORDED VIDEO

(75) Inventors: Greg Millar, Coarsegold, CA (US); Farzin Aghdasi, Clovis, CA (US); Lei Wang, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 154 days.

(21) Appl. No.: 12/982,601

(22) Filed: Dec. 30, 2010

(65) Prior Publication Data
US 2012/0170803 A1 Jul. 5, 2012
US 2013/0028467 A9 Jan. 31, 2013

(51) Int. Cl.
G06K 9/00 (2006.01)
G06F 17/30 (2006.01)
G06K 9/34 (2006.01)

(52) U.S. Cl.
CPC ...... G06F 17/30784 (2013.01); G06F 17/3079 (2013.01); G06K 9/00771 (2013.01); G06K 9/346 (2013.01)

(58) Field of Classification Search
USPC .................................. 382/103, 104, 159, 199
See application file for complete search history.

(56) References Cited

U.S. PATENT DOCUMENTS

| 6,084,595 | A | 7/2000 | Bach et al. |
| 6,084,982 | A * | 7/2000 | Challapali et al. ............ 382/166 |
| 6,169,821 | B1 | 1/2001 | Fukunaga et al. |
| 6,359,647 | B1 | 3/2002 | Sengupta et al. |
| 6,404,455 | B1 | 6/2002 | Ito et al. |
| 6,724,421 | B1 | 4/2004 | Glatt |
| 6,812,835 | B2 | 11/2004 | Ito et al. |
| 7,034,959 | B1 | 4/2006 | Takemoto |
| 7,242,423 | B2 | 7/2007 | Lin |
| 7,295,228 | B2 | 11/2007 | Roberts et al. |
| 7,321,624 | B1 | 1/2008 | Allmen et al. |
| 7,336,297 | B2 | 2/2008 | Ishigami et al. |
| 7,386,170 | B2 | 6/2008 | Ronk et al. |
| 7,391,907 | B1 | 6/2008 | Venetianer et al. |
| 7,480,414 | B2 * | 1/2009 | Brown et al. ................. 382/224 |
| 7,567,513 | B2 | 7/2009 | Cho |

(Continued)

FOREIGN PATENT DOCUMENTS

| JP | 2001-211339 A | 8/2001 |
| JP | 2010-278968 A | 12/2010 |
| WO | 2005099270 A2 | 10/2005 |

OTHER PUBLICATIONS

International Search Report and Written Opinion; PCT/US2011/067787; Aug. 9, 2012.

(Continued)

Primary Examiner — Matthew Bella
Assistant Examiner — Weiwen Yang
(74) Attorney, Agent, or Firm — Hunter Clark PLLC

(57) ABSTRACT

Embodiments of the disclosure provide for systems and methods for creating metadata associated with a video data. The metadata can include data about objects viewed within a video scene and/or events that occur within the video scene. Some embodiments allow users to search for specific objects and/or events by searching the recorded metadata. In some embodiments, metadata is created by receiving a video frame and developing a background model for the video frame. Foreground object(s) can then be identified in the video frame using the background model. Once these objects are identified they can be classified and/or an event associated with the foreground object may be detected. The event and the classification of the foreground object can then be recorded as metadata.

34 Claims, 11 Drawing Sheets

(56) References Cited

U.S. PATENT DOCUMENTS

| | | | |
|---|---|---|---|
| 7,583,275 B2* | 9/2009 | Neumann et al. | 345/633 |
| 7,760,908 B2 | 7/2010 | Curtner et al. | |
| 7,827,257 B2 | 11/2010 | Chu | |
| 7,916,944 B2 | 3/2011 | Yang et al. | |
| 8,345,157 B2 | 1/2013 | Oishi | |
| 2002/0051491 A1 | 5/2002 | Challapali et al. | |
| 2002/0181767 A1 | 12/2002 | Deng et al. | |
| 2005/0008198 A1 | 1/2005 | Guo et al. | |
| 2005/0047657 A1 | 3/2005 | Lee | |
| 2005/0220361 A1 | 10/2005 | Yamasaki | |
| 2006/0007308 A1 | 1/2006 | Ide et al. | |
| 2006/0104488 A1* | 5/2006 | Bazakos et al. | 382/118 |
| 2006/0204077 A1* | 9/2006 | Lim et al. | 382/154 |
| 2006/0233436 A1 | 10/2006 | Ma et al. | |
| 2006/0284976 A1* | 12/2006 | Girgensohn et al. | 348/135 |
| 2007/0064107 A1 | 3/2007 | Aggarwal et al. | |
| 2007/0076957 A1 | 4/2007 | Wang et al. | |
| 2008/0192820 A1 | 8/2008 | Brooks et al. | |
| 2009/0087085 A1 | 4/2009 | Eaton et al. | |
| 2009/0087096 A1* | 4/2009 | Eaton et al. | 382/190 |
| 2009/0192990 A1 | 7/2009 | Chin et al. | |
| 2009/0195382 A1* | 8/2009 | Hall | 340/541 |
| 2009/0303329 A1 | 12/2009 | Morisaki | |
| 2010/0111370 A1* | 5/2010 | Black et al. | 382/111 |
| 2010/0166325 A1 | 7/2010 | Sengamedu et al. | |
| 2010/0177969 A1 | 7/2010 | Huang et al. | |
| 2010/0296742 A1 | 11/2010 | Chandrasekaran et al. | |
| 2010/0309973 A1 | 12/2010 | Chein et al. | |
| 2011/0044536 A1* | 2/2011 | Cobb et al. | 382/165 |
| 2011/0063445 A1* | 3/2011 | Chew | 348/159 |
| 2011/0157368 A1 | 6/2011 | Jo | |
| 2011/0187703 A1 | 8/2011 | Patwardhan et al. | |
| 2012/0038776 A1 | 2/2012 | Ahiska et al. | |
| 2012/0133773 A1 | 5/2012 | Brogren et al. | |
| 2012/0140066 A1 | 6/2012 | Lin | |
| 2012/0195363 A1 | 8/2012 | Laganiere et al. | |
| 2012/0206605 A1 | 8/2012 | Buehler et al. | |

OTHER PUBLICATIONS

International Search Report and Written Opinion; PCT/US2011/067872; Jul. 24, 2012.
International Search Report and Written Opinion; PCT/US2011/066974; Sep. 14, 2012.
International Search Report and Written Opinion; PCT/US2011/066956; Sep. 19, 2012.
International Search Report and Written Opinion; PCT/US2011/067732; Aug. 9, 2012.
Non-Final Office Action; U.S. Appl. No. 12/982,602, filed Feb. 27, 2013.
Final Office Action; U.S. Appl. No. 12/982,602, filed Sep. 24, 2013.
Non-Final Office Action; U.S. Appl. No. 12/982,138, filed Nov. 13, 2013.
Non-Final Office Action; U.S. Appl. No. 12/982,602, filed Dec. 30, 2013.
Strat, T. M. (2001). Object-based encoding: next-generation video compression. In MPEG-4. 2001 Proceedings of Workshop and Exhibition on (pp. 53-57). IEEE.
Watanabe, H., & Jinzenji, K. (2001). Sprite coding in object-based video coding standard: MPEG-4. World Multiconf. Systemics, Cybernetics and Informatics (SCI) 2001, Proc, 420-425.
Lee, M. C., Chen, W. G., Lin, C. L. B., Gu, C., Markoc, T., Zabinsky, S. I., & Szeliski, R. (1997). A layered video object coding system using sprite and affine motion model. Circuits and Systems for Video Technology, IEEE Transactions on, 7(1), 130-145.
Srinivasamurthy, N., Siddaramanna, M., & Rajore, R. (2009). Smart Codec Features in TMS320DM365. Application Report, SPRAB83.
Final Office Action; U.S. Appl. No. 12/982,138, filed May 2, 2014.
Final Office Action; U.S. Appl. No. 12/982,602, filed Jun. 24, 2014.
IP Australia 1st Examination Report for Application No. 2011352408, dated Nov. 24, 2014, 3 pgs.
Notice of Allowance; U.S. Appl. No. 12/982,602, filed Feb. 23, 2015.
Notice of Allowance; U.S. Appl. No. 12/982,138, filed Mar. 3, 2015.
International Preliminary Report on Patentability dated Jul. 2, 2013, for International Application No. PCT/US2011/066956, 6 pgs.
International Preliminary Report on Patentability dated Jul. 2, 2013, for International Application No. PCT/US2011/067732, 4 pgs.
International Preliminary Report on Patentability dated Jul. 11, 2013, for International Application No. PCT/US2011/067787, 9 pgs.
SIPO 1st Office Action for Application No. 201180062817.6 dated Nov. 4, 2014, 3 pgs.
Notice of Allowance; U.S. Appl. No. 12/982,602, filed Apr. 2, 2015, 5 pgs.
Notice of Allowance; U.S. Appl. No. 12/982,138, filed May 22, 2015, 5 pgs.
IP Australia 1st Examination Report for Application No. 2011352157, dated Aug. 3, 2015, 3 pgs.

* cited by examiner

SEARCHING RECORDED VIDEO

BACKGROUND

Searching recorded video can be an extremely time consuming and labor intensive process. Video surveillance systems normally include a recorder for recording the video captured by the surveillance cameras. Initially, videocassette recorders were used for recording this data; however, the tapes could only be searched by having personnel review the tapes to find the portion of interest. The development of digital video recorders improved the searching process with the use of algorithms to search for specific items, such as when an item has disappeared from the area being viewed by the video camera. However, the ability to quickly and easily find a specific video clip has not significantly improved; the process still requires personnel to review the video as with VCR tapes.

Video analytics is quickly gaining attention within the video security industry, and systems and components that use rather advanced techniques for extracting high-level information from a digital video stream are starting to be deployed. Video analytics is usually implemented in one of two places: 1) at the "edge", i.e., at the camera end, or 2) at the "head end", the device in the system having significant processing power. Most early attempts at video analytics were implemented at the head end because the amount of computational horsepower needed for meaningful analysis was only available in a personal computer type platform. Thus analog video was piped into a PC through a video capture card that would digitize video and present the frames to the analysis software. The computer would perform a variety of computations on these digital frames and detect various behaviors and then report these either through a proprietary graphical user interface directly to an operator or generate information via some signaling system (usually an IP network) to another system which could either log that information or generate alarms or events within some surveillance system.

BRIEF SUMMARY

Examples of a systems and methods for creating metadata associated with video data are provided. The metadata can include data about objects viewed within a video scene and/or events that occur within the video scene. Some embodiments of the disclosure allow users to search for specific objects and/or events by searching the recorded metadata. In some embodiments, metadata is created by receiving a video frame and developing a background model for the video frame. Foreground object(s) can then be identified in the video frame using the background model. Once these objects are identified, they can be classified and/or an event associated with the foreground object may be detected. The event and the classification of the foreground object can then be recorded as metadata.

A method for creating metadata associated with a video frame is provided. A video frame is received and a background model developed from the video frame. A foreground object can then be separated from the video frame using the background model. The foreground object can be classified into a classification. For example, the classification can characterize the foreground object based on the object color, aspect ratio, and position. The classification of the foreground object can then be recorded in metadata.

A method for creating metadata about a video frame is provided. The method can include receiving a video frame; developing a background model for the video frame; separating a foreground object from the video frame using the background model; identifying the foreground object as a previously identified foreground object; classifying the foreground object into a classification based on characteristics of the foreground object; and recording the classification of the object in metadata. The characteristics of the foreground object that are used for classification can include the object location within the video frame, the object color, and the object aspect ratio.

Another method is provided. A search query can be received from a user through a user interface. The search query can include information for searching for either or both a classification of an object and an event associated with an object. Metadata files associated with the search query can then be retrieved. The metadata files can include information regarding either or both object classifications and object events within a video frame. The retrieved metadata files can be searched for metadata that matches the search query. And a listing of video segments that match the search query can be provided through the user interface.

A video camera system is provided that includes a video camera, an output port, and a processor. The video camera can be configured to capture video data of a scene and outputting the video data as digital data. The processor can be communicatively coupled with the camera. The processor can be configured to: receive video data from the video camera, develop a background model for the video data, separate a foreground object from the video data using the background model, identify the foreground object's location within the a video scene of the video data, determine the foreground object's color, and record the foreground objects location and color in metadata. The output port can be communicatively coupled to the processor and configured to output the metadata.

A video processing system is provided that includes a video input port, a processor and a video output port. The video input port can be configured to receive video data. The processor can be communicatively coupled to the video input port and the video output port. The processor can be configured to: develop a background model for the video data, separate a foreground object from the video data using the background model, determine the relative location of the foreground object, and determine the relative color of the foreground object. The video output port can be configured to output the relative location and the color of the foreground object as metadata.

In some embodiments, the background model can include either or both a short-term background model and a long-term background model. In some embodiments, shadows and reflections can be removed from the video data. In some embodiments, an event associated with the foreground object can be detected and stored in metadata. In some embodiments, the foreground object can be classified by one or more of the following characteristics: of location within the video frame, object size, object color, object type, and/or object aspect ratio.

In some embodiments, an event can include an object entering a frame, the object leaving the frame, camera sabotage, the object holding still, the object merging with another object, the object splitting into two objects, the object entering a zone, the object leaving a zone, the object crossing a tripwire, the object being removed, the object being abandoned, object counting, object loitering, and/or object timer.

In some embodiments, the foreground object can classified by object type and/or object velocity. In some embodiments, the background model can be constructed using a probability Gaussian model. In some embodiments, the foreground object can separated from the video frame by subtracting the background model from the video frame to return a foreground object. In some embodiments, the classification data associated with the object are recorded as metadata separate from the video data.

A method for searching video data is also provided. A search query can be received from a user through a user interface. The search query can include a plurality of query dimensions. A distance measure between the query dimensions and the dimensions of objects identified in metadata stored within a video database can be calculated. A listing of video segments can be provided through the user interface. The video segments can include an object with a distance measure less than a threshold value.

A non-transitory computer readable medium comprising code executable by a processor for performing a metadata search is also provided. The code can cause the processor to receive a search query from a user through a user interface that includes a set of query dimensions, calculate the distance between the set of query dimensions and a set of object dimensions associated with objects identified in video frames, and provide a listing of video segments through the user interface. The video segments can include an object with a distance measure less than a threshold value.

A video processing system is also provided that includes a user interface, a video storage device, and a processor. The user interface can be configured to receive user input. The video data storage device can store video metadata. The processor can be communicatively coupled with the user interface and the video data storage device. The processor can be configured to receive a search query through the user interface that includes a plurality of query values, and calculate a distance measure between the query values and corresponding values associated with video metadata stored in the video storage device.

In some embodiments, a search query can include an object classification and/or an object events. In some embodiments, a search query can include information identifying an object location in the field of view of a particular camera, a range within a classification, and/or a range of events.

In some embodiments, the query dimensions and object dimensions are associated with a classification of the object, an event associated with the object, x axis location, y-axis location, color, x-axis speed, y-axis speed, and/or aspect ratio. In some embodiments, a distance can be calculated using $d=\sqrt{(x_1-q_1)^2+(x_2-q_n)^2+\ldots+(x_n-q_n)^2}$, wherein $x_n$ is the $n^{th}$ object dimension and $q_n$ is the $n^{th}$ query dimension.

Items and/or techniques described herein may provide one or more of the following capabilities, as well as other capabilities not mentioned. For example, using embodiments described herein, video data can be produced in real time with metadata that includes information about objects and events captured in the video data. Moreover, video data can be analyzed and metadata created based on previously recorded video data. Furthermore, according to some embodiments, users can search the metadata based on characteristics of objects and/or events documented in metadata to find the desired video data. Various other capabilities may also be provided. While item/technique-effect pairs have been described, it may be possible for a noted effect to be achieved by means other than those noted, and a noted item/technique may not necessarily yield the noted effect.

The processes and systems described herein, and the attendant advantages, applications, and features thereof, will be more fully understood by a review of the following detailed description, figures, and claims.

DETAILED DESCRIPTION

Techniques are discussed herein for creating metadata describing objects and/or events about a video scene. Metadata can be created by analyzing a video scene in real time to produce a file with information describing characteristics of an object within the video scene and/or events that occur within the video scene. In some embodiments, the metadata can be created in real time. In some embodiments, a camera can collect video data of a roadway scene. Background information about the scene can be created over a period of video frames. From the background information, foreground objects can be identified and classified based on the characteristics of the foreground object. One or more events associated with the object can also be determined from the video data. The classification of the object and/or events of the object can then be recorded in association with the video data.

For example, a video camera can be used to capture video data of a roadway scene. And a background model can be developed from the video data. This background model can include static objects and characteristics of the scene. A background model of a street scene, for example, might include the street, trees, signs, buildings, etc. Using the background model foreground objects can be identified and classified. For example, cars that pass through the scene can be identified and classified as cars. Their color and/or size may also be classified. Various events associated with the identified cars can be determined. For example, such events can include a car traveling in the right or wrong direction, or a car that dwells in a particular location for long periods of time. Various other events can be identified. This object data and event data can then be recorded as metadata associated with the video data. This metadata can then be used to search and retrieve video data of interest.

Figure 1:
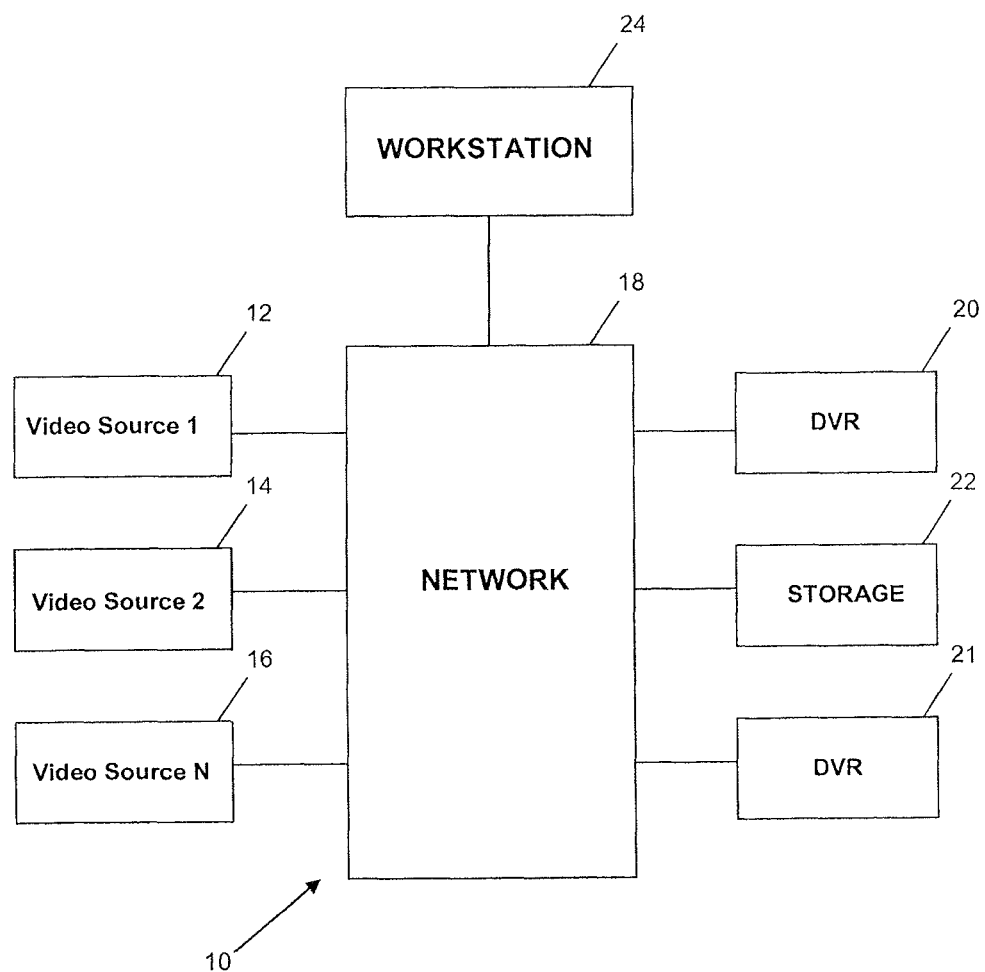
FIG. 1 is a block diagram of a video surveillance system in which various aspects of searching recorded video can be implemented according to some embodiments of the disclosure.

Referring to FIG. 1, video surveillance system 10 is shown in block diagram form. Video surveillance system 10 can include a plurality of video sources from 1 through n, which are labeled 12, 14, and 16, connected to network 18. Video sources 12, 14, and 16 can include, for example, still or full motion video cameras. Moreover, video sources 12, 14, and 16 can produce raw digital or analog video data. If video sources 12, 14, and 16 produce analog video data, a digitizer can be used to digitize the video data. Video sources 12, 14, and 16 can capture and provide color or monochromatic video data.

Network 18 can be a closed network, local area network or wide area network, such as the Internet. A plurality of digital video recorders (DVR) 20 and 21 are also connected to network 18 for recording the video from video sources 12, 14, and 16. In some embodiments, one or more digital video recorders 20 or 21 can be a network video recorder, or can be connected directly to a display or workstation. The digital video recorders can include any type of video storage device including a hard drive and/or a flash drive. As used herein, recorded video includes full-motion video and still photographs taken at intervals. Storage 22 can be connected to network 18 to provide additional storage for recorded video which, for example, can be transferred from digital video recorder 20 for short-term or long-term storage. Storage 22 can be connected to network 18 as shown or directly to digital video recorder 20, such as an expansion box. Workstation 24 can be connected to network 18 to provide a user with a display and input capability. Workstation 24 can be a general purpose computer with software for implementing software searching methods for searching recorded video data and for providing a graphical user interface for searching recorded video data, or it can be simply a display and user input device for accessing video surveillance system 10 and utilizing the video data search methods. The graphical user interface software for searching the recorded video data and the video searching software can reside anywhere in the system such as, for example, workstation 24, digital video recorder 20 or storage 22. Various other combinations of video sources, video recorders, networks, and/or workstations can be utilized.

Figure 2:
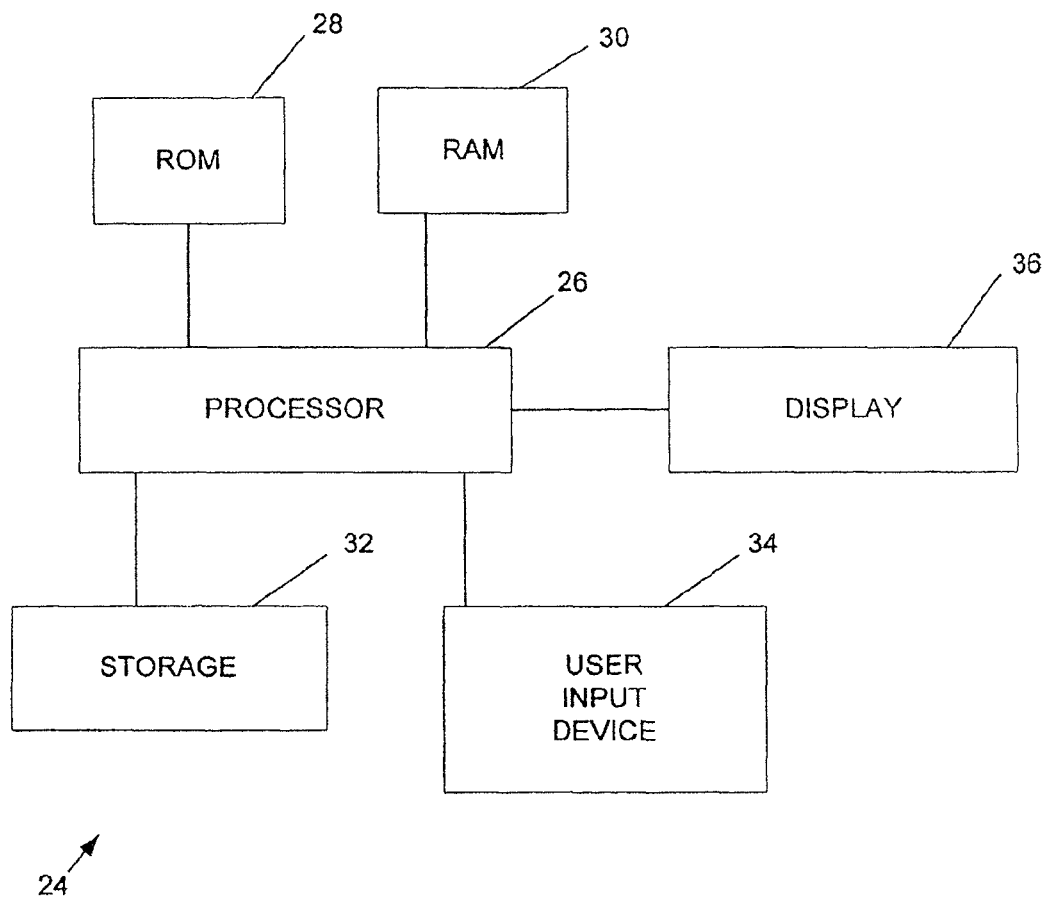
FIG. 2 is a block diagram of one embodiment of the workstation shown in FIG. 1.

FIG. 2 illustrates one embodiment of workstation 24 for implementing video data search methods. Processor 26 is connected to ROM 28, RAM 30, and storage 32, which can be a hard disk drive, compact disc drive, optical drive, and the like. Processor 26 can be an intelligent device, e.g., a personal computer central processing unit (CPU) such as those made by Intel® Corporation or AMD®, a microcontroller, an application specific integrated circuit (ASIC), etc. Processor 26 implements a software program for displaying a graphical user interface that is stored in ROM 28 or storage 32. Processor 26 provides output signals to display 36 to display the graphical user interface for implementing video data search methods. User input device 34 can be a mouse, jog/shuttle controller, keyboard, or other suitable input device connected to processor 26 to provide user input to search the stored video data. The recorded video data searched by workstation 24 can be stored in one or more of digital video recorder 20, digital video recorder 21, or storage 22 of video surveillance system 10.

A device manager can be used to store (e.g., in ROM 28, RAM 30, or storage 32) processor-readable, processor-executable software code containing instructions for controlling processor 26 to perform functions described below (although the description may read that the software performs the function(s)). The functions implement various video object classifying and/or event identifying systems, for example. The software can be loaded onto the memory by being downloaded via a network connection, uploaded from a disk, etc. Further, the software may not be directly executable, e.g., requiring compiling before execution.

Figure 3:
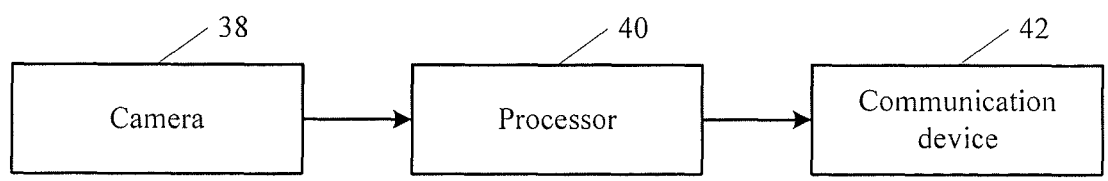
FIG. 3 is a block diagram of one embodiment of the video source shown in FIG. 1.

An example of a video source is illustrated in FIG. 3 for any of video sources 12, 14, or 16 in FIG. 1 according to some embodiments. Camera 38 provides raw video data to processor 40. Processor 40 can include any type processing unit and memory. Processor 40 can compress the raw video data into a digital video format, for example MPEG. Processor 40 can also perform various tasks including data modification, data packetization, creation of metadata, etc. The compressed video data can be streamed, for example, to communication device 42 (e.g., network device, modem, wireless interface, etc.) for transmitting to network 18. While camera 38, processor 40 (server and/or encoder), and communication device 42 have been shown as separate devices, their functions can be provided in a single device or in two devices rather than three separate devices as illustrated.

A scene analyzer algorithm can be implemented in camera 38, processor 40, and/or workstation 24 to detect an aspect or occurrence in the scene in the field of view of camera 38; such as, for example, to detect and track an object in the monitored scene. If the scene analysis is performed in camera 38 or processor 40, the information about events and objects can be sent as metadata with the video data to network 18. This video data can include, for example, the detection of a person crossing a trip wire or the detection of a red vehicle. Alternatively, the video could be streamed over network 18 and then analyzed by, for example, DVR 20 before the streamed video is stored.

Figure 4:
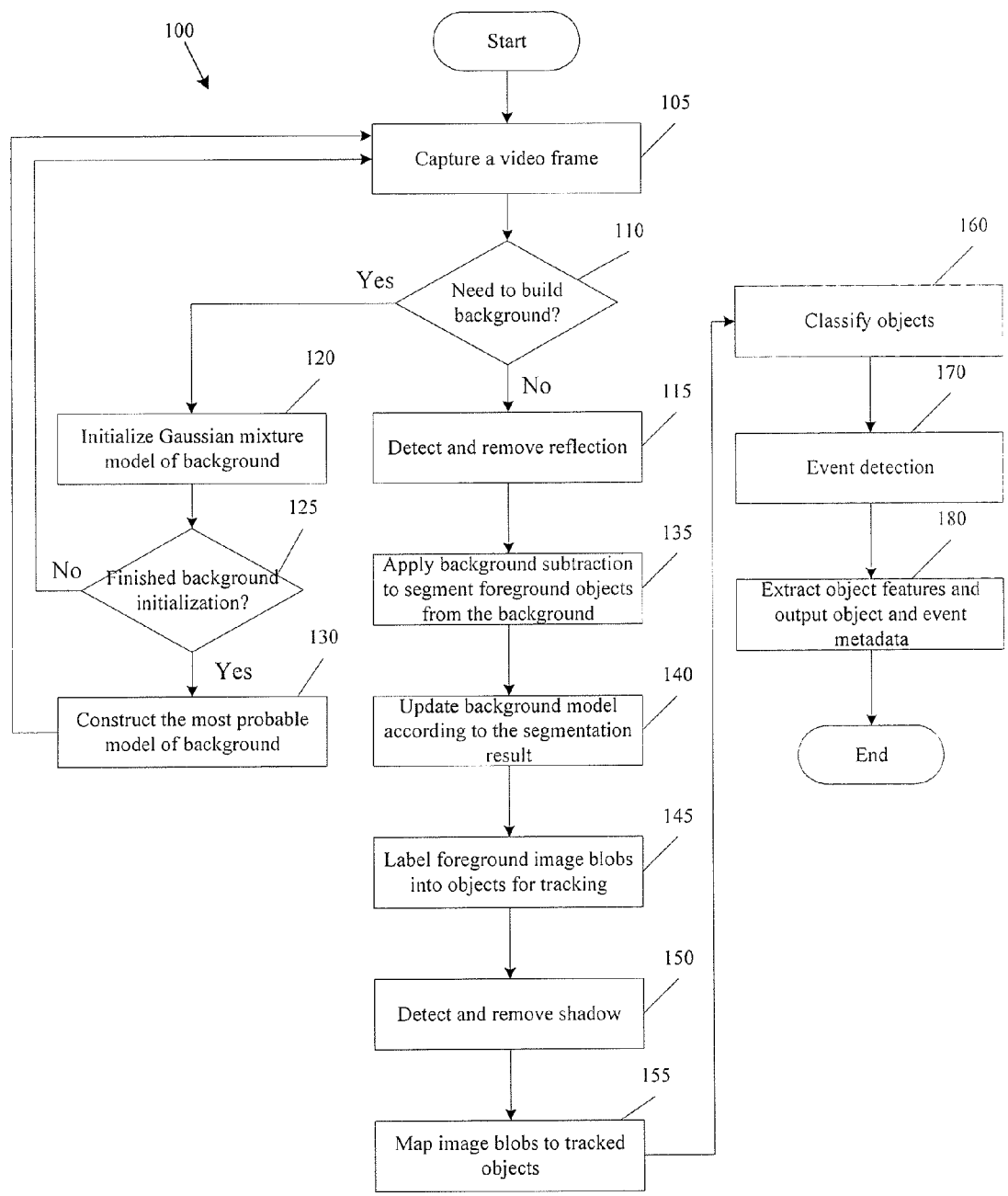
FIG. 4 is a process for analyzing a scene according to some embodiments according to some embodiments.

Referring to FIG. 4 process 100 of analyzing a scene includes the blocks shown. Process 400 is, however, an example only and not limiting. Process 100 can be altered, e.g., by having stages added, removed, rearranged, combined, and/or performed concurrently. For example, at blocks 120, 125, and 130 a background model can be constructed. Still other alterations to process 100 as shown and described are possible. In some embodiments, process 100 can be implemented within a processor contained within or coupled with a video source or a video camera. In some embodiments, process 100 can operate on video data in real time. That is, as video frames are captured, process 100 can identify objects and/or detect object events as fast as or faster than video frames are captured by the video source. For example, if the video source captures 30 video frames every second, process 100 can be implemented on each frame or on a series of frames at the same or greater rate.

Process 100 can begin at block 105 by capturing a video frame. The video frame can be captured in real time from a video source or retrieved from data. Process 100 utilizes a Gaussian model for excluding static background images and images with repetitive motion without semantic significance (e.g., trees moving in the wind) can be used to subtract the background of the scene from the objects of interest. Other models may also be used. In order to detect objects in the scene, a Gaussian mixture model is applied to the video frame (or frames) to create the background as shown blocks 110, 120, 125, and 130. With this approach, a background model is generated even if the background is crowded and there is motion in the scene. Gaussian mixture modeling is very time consuming for real-time video processing, and it is hard to optimize due to its computation properties. In order to accelerate the background subtraction processing, the most probable model is selected for the description of the corresponding pixel. A degraded single Gaussian model can be constructed at block 130 and applied at block 135. Various other background training algorithms or processes can be used to create a background scene. At block 115 reflections can be detected and removed from the video frame.

In some embodiments, a second background model can be used in conjunction with the background model described above or as a stand alone background model. This can be done, for example, in order to improve the accuracy of object detection and remove false objects detected due to an object that has moved away from a place after it stays there for a period of time. Thus, for example, a second "long-term" background model can be applied after a first "short-term" background model. The build process of the long-term background is the same as the short-term background model except that it updates at a much slower rate. That is, it uses more video frames over a longer period of time to create the background model. If an object is detected using the short-term background, yet an object is considered part of the background from the long-term background, then the detected object is a false object (e.g., an object stayed in the place for a while and left). In this case, the object area of the short-term background model should be updated with that of the long-term background model. Otherwise, if an object appears in the long-term background but it is background in the short-term background, then the object has merged into the short-term background. If the object is detected in both of background models, then the odds of the object being a foreground object is high. Using the long-term background model is optional.

For a captured video frame, a background subtraction method is applied at block 135 to extract the foreground pixels. The background model is updated according to the segmentation result at block 140. Since the background will not change quickly, it is not necessary to update the background model for the whole image in each frame. However, if the background model is updated every N (N>0) frames, the processing speeds for the frame with background updating and the frame without background updating are significantly different and this may at times cause motion detection errors. In order to overcome this problem, only a part of the background model is updated in every frame so that the processing speed for every frame is the same and speed optimization is achieved. After morphological filtering, the foreground pixels are grouped into image blobs, groups of similar pixels, at block 145. These image blobs represent the objects detected in the current frame.

To remove the small noisy image blobs due to segmentation errors and find a qualified object according to its size in the scene, a scene calibration method, for example, can be utilized to detect the blob size. For scene calibration, a perspective ground plane model is assumed. A qualified object should be higher than a threshold height (e.g., minimal height) and narrower than a threshold width (e.g., maximal width) in the ground plane model. The ground plane model is calculated via designation of two horizontal parallel line segments at different vertical levels, and the two line segments should have the same length as the real world length of the vanishing point (a point in a perspective drawing to which parallel lines appear to converge) of the ground plane can be located and the actual object size can be calculated according to its position to the vanishing point. The maximal/minimal width/height of a blob is defined at the bottom of the scene. If the normalized width/height of a detected image blob is smaller than the minimal width/height or the normalized width/height is wider than the maximal width/height, the image blob will be discarded. At block 150, reflections and shadows can be detected and removed from the video frame.

Figure 12:
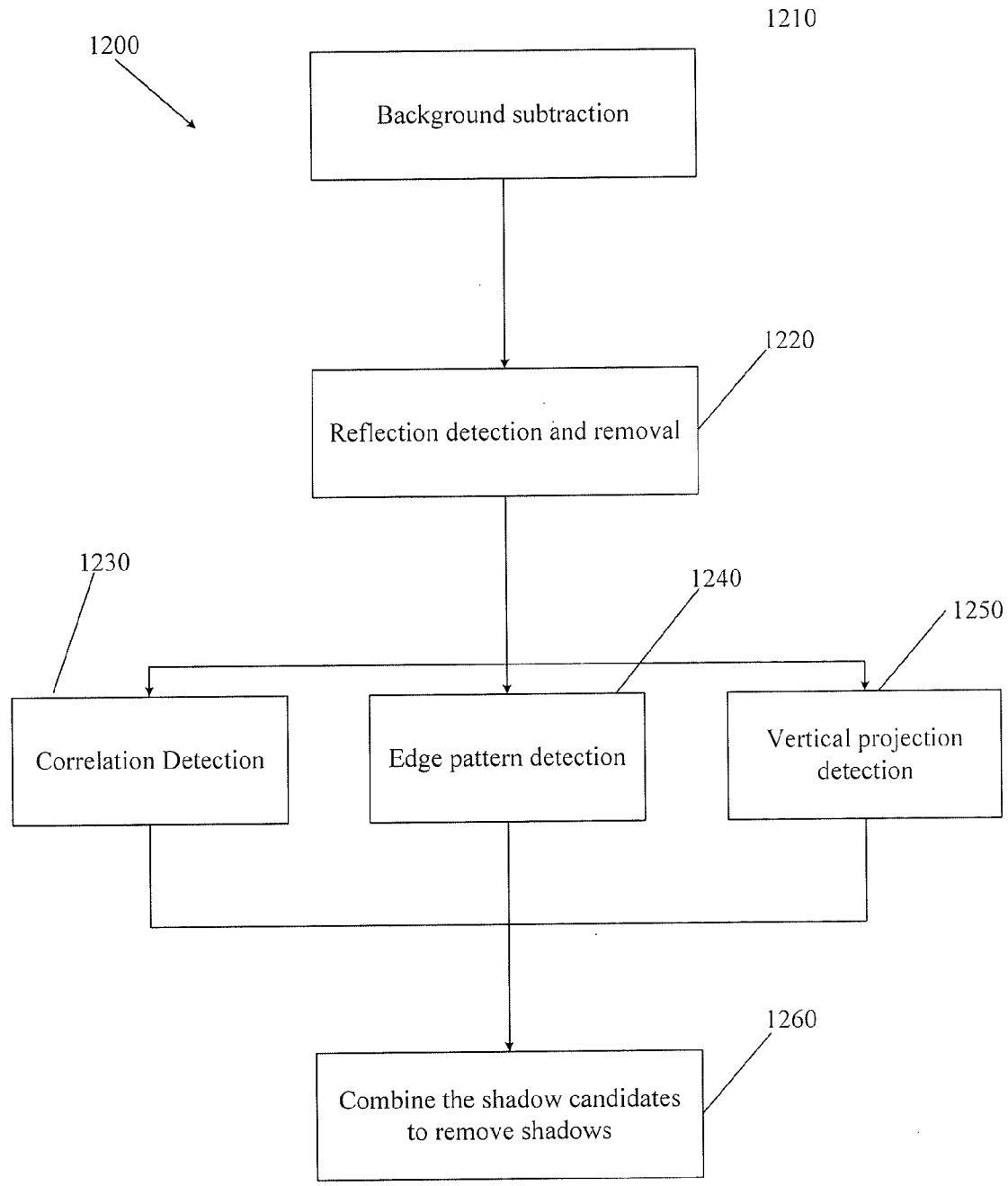
FIG. 12 is a flowchart for detecting shadow and reflection in a video frame according to some embodiments.

Reflection detection and removal can be conducted before or after shadow removal. In order to remove any possible reflections, the first step is to check if the percentage of the foreground pixels is very high compared to the number of pixels of the whole scene. If the percentage of the foreground pixels is higher than a threshold value, then following can occur. Referring to FIG. 12 process 1200 for removing reflection includes the blocks shown. At block 1210, a difference image is generated by subtracting the intensity of current frame from a background image. At block 1220 reflection and shadow detection and removal can occur. This can be done in a number of ways. For example, a histogram of the difference image can be calculated and the maximum (or points above a threshold) of the histogram can be found. If the maximum is significantly shifted away from zero, a reflection is detected. In order to remove such reflection effects, the intensity of each pixel in the current frame can be shifted by the same amount that the histogram maximum is shifted from zero. Doing so assumes that every pixel has shifted the same value from the original intensity. Shadows can then be detected and removed using a number of processes.

Since the shadow has the same texture pattern as the background, image correlation techniques can be used to detect shadows at block 1230. If the correlation between the background and the current frame is over a predefined threshold (e.g., 0.95) then the current image block is darker than the background and the current image block can be considered to possibly include shadow effects. Another can use edge detection to detect shadows at block 1240. The gradient of each pixel within the current video frame along the x-axis and the y-axis can be determined. If absolute value of the gradient is greater than a threshold, then the corresponding pixel is an edge pixel. For a foreground image, if the background has certain edges, the corresponding image block of the current frame can be detected to see if the edge pattern is similar. If most of the edge pixels are the same for the two images, then the corresponding image block may include shadows. At block 1250 vertical projection detection can be used to detect shadows. Shadows typically occur at the bottom of an object and its vertical projection in the object is much narrower than the corresponding object and thus the shadow can be removed by resize the objects according to the vertical projection calculation of the objects. From both sides of the object, if the vertical projection is less than a certain percentage of the maximal value of the vertical projection, the current vertical line can be a shadow candidate. At block 1260 two or more shadow detection techniques can be combined to remove shadows from the video frame.

Figure 13:
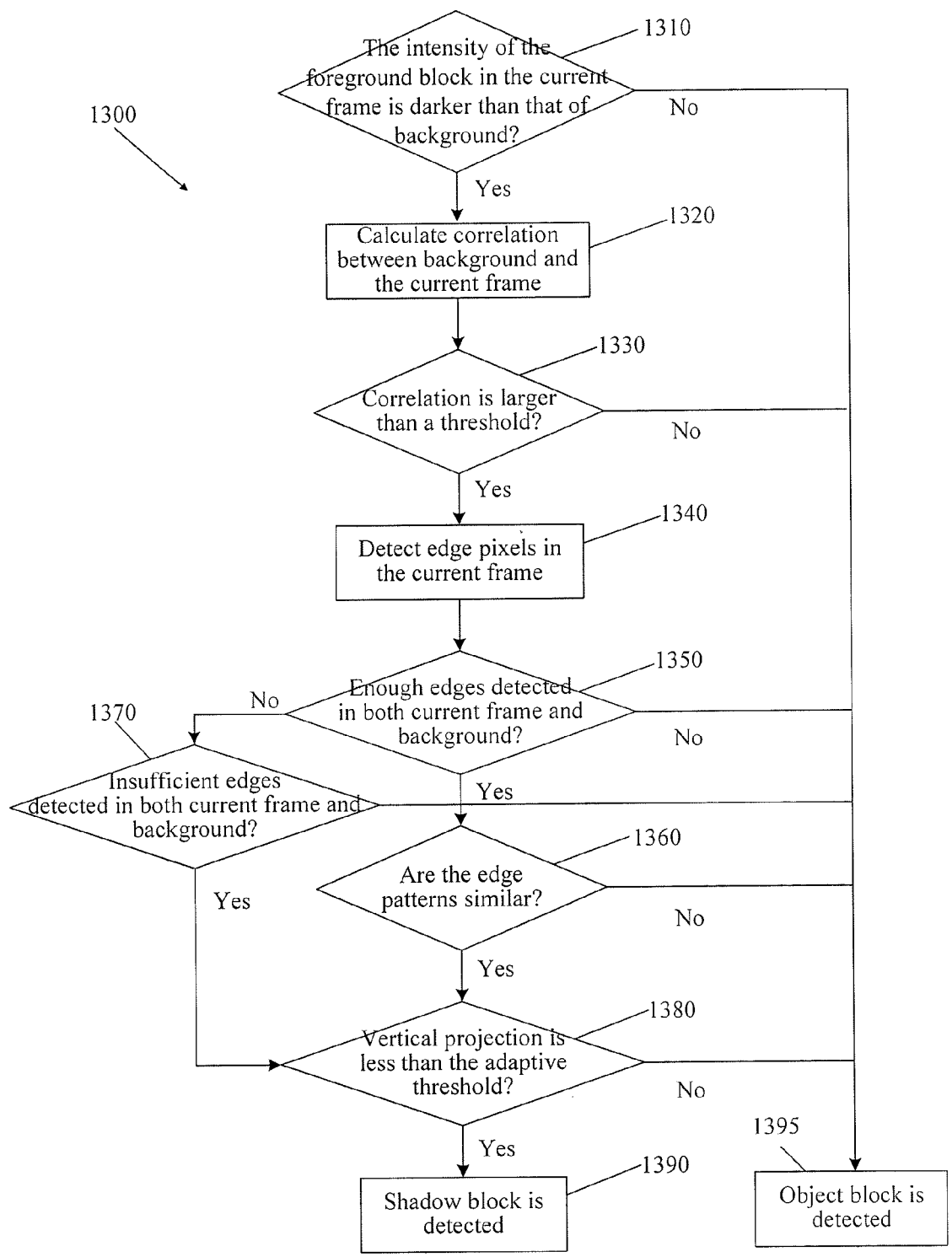
FIG. 13 is a flowchart for detecting shadow and reflection in a video frame according to some embodiments.

Process 1300 in FIG. 13 is another technique for shadow removal. For each image block that contains foreground pixels detected from background subtraction algorithm, the intensity differences of the current frame and the background image block are measured at block 1310. If the intensity of the current foreground pixel is darker than the background, then process 1300 proceeds to block 1320, otherwise, process 1300 proceeds to block 1395 and the image is identified as an object block. At block 1320, the correlation between the image blocks of the current frame and the background is calculated. If the correlation is less than a threshold, the block is not similar to the background and process 1300 proceeds to block 1395 where the image block is labeled an object block. Otherwise, process 1300 proceeds to block 1340. At block 1340, edges are detected for the image block in the current frame and the background. At block 1350, edge pixels are measured to see if the there are enough edge pixels for edge pattern matching. If there are enough edges in both the current frame and the background image, process 1300 proceeds to block 1360. If not, process 1300 proceeds to process 1370. At block 1360, if the edge patterns are not similar in the current frame and the background, the block is determined to be an object block at process 1300 proceeds to block 1395. Otherwise, process 1300 proceeds to block 1380. At block 1370, if there is no insufficient edges only in one block, the block is determined to be an object block and process 1300 proceeds to block 1380. Otherwise, process 1300 proceeds to block 1380, where the vertical projection is calculated for the foreground pixels for the whole object. If the vertical projection is less than the adaptive threshold which is determined with the maximal vertical projection, the block is considered a shadow block at step 1390, otherwise, it is determined to be an object block at block 1395.

If there is no object that can be mapped to the detected image blob, a new object will be created for the image blob. Otherwise, the image blob will be mapped to an existing object at block 155. The new created object will not be further processed until it appears in the scene for a period of time and moves around over at least a minimal distance. In this way, many false objects are filtered out.

With the above procedure, the objects in the scene can be tracked. The next block is to classify the objects within the scene at block 160. A single person can be classified from a vehicle or group of people according to the aspect ratio, physical size, and vertical profile of the shape of the object. The vertical profile is defined as a 1-dimensional projection of vertical coordinate of the top pixel of the foreground pixels in the object region. This vertical profile can first be filtered with a low-pass filter. From the calibrated object size, the classification result can be refined since the size of a single person is always smaller than that of a vehicle. A group of people and a vehicle can be classified via their shape difference. For instance, the size of a human width in pixels can be determined at the location of the object. A fraction of the width can be used to detect the peaks and valleys along the vertical profile. If the object width is larger than a person's width and more than one peak is detected in the object, it is very possible that the object is a group of people instead of a vehicle. A color description based on discrete cosine transform (DCT) or other transforms such as discrete sine transform, Walsh transform, Hadamard transform, fast Fourier transform, wavelet transform, etc on object thumbs (e.g. thumbnail images) can be applied to extract color features (quantized transform coefficients) for the detected objects.

A sample list of events that may be detected at block 170 includes the following events: an object enters the scene, an object leaves the scene, the camera is sabotaged, an object is still in the scene, objects merge, objects split, an object enters a predefined zone, an object leaves a predefined zone, an object crosses a tripwire, an object is removed, an object is abandoned, an object moving in a direction matching a predefined forbidden direction for a zone or tripwire, object counting, object removal (e.g., when an object is still longer than a predefined period of time and its size is larger than a large portion of a predefined zone), object abandonment (e.g., when an object is still longer than a predefined period of time and its size is smaller than a large portion of a predefined zone), dwell timer (e.g., the object is still or moves very little in a predefined zone for longer than a specified dwell time), and object loitering (e.g., when an object is in a predefined zone for a period of time that is longer than a specified dwell time).

At block 180 the metadata can be created from the movement of the tracked objects or from an event derived from the tracking. This description combines the object information with the events in a unified expression. The objects may be described, for example by their location, color, size, aspect ratio. The objects may also be related with events with their corresponding object identifier and time stamp. All of the events should be generated via a rule processor with rules defined to let the scene analysis software decide what kind of object information and events should be provided in the metadata associated with the video frame. The rules can be established in any number of given ways, such as by a system administrator who configures the system or by an authorized user who can reconfigure one or more of the cameras in the system.

A video source (e.g., video source 12 in FIG. 1) can provide a search frame comprising video data and metadata through a number of different methodologies that will then be used later for searching the video. For example, the video source can provide the metadata associated with a frame and the frame itself for each frame in the video stream, thereby making each video frame a search frame. Alternatively the video source can create search frames by providing a JPEG image at predetermined intervals and the metadata associated with that JPEG image, which could then be compressed and sent over a network (e.g., network 18 in FIG. 1). In another alternative embodiment, the video source can create a search frame by providing metadata associated with each I-frame in an MPEG compliant stream. Any of the foregoing examples of methodologies can be used to provide a plurality of search frames. Each record would represent an object snapshot taken at, for example, half second intervals, to create a large number of small records. For example, the plurality of search frames could comprise a JPEG image at predetermined intervals and the metadata associated with each JPEG image. By way of example, if the video stream from the video source were being received by a DVR (e.g., DVR 20 in FIG. 1), then the search frames from the video source would also be received by the DVR. Depending upon the methodology used to create the search frames, the DVR can receive the search frames and store them in an appropriate file, such as for periodic separate JPEG images or, for example, stores a copy of the I-frames from an MPEG compliant stream in an appropriate file. The metadata associated with each search frame can either be separated from the video data or the metadata is copied so that a metadata search file is created. The metadata for each search frame is associated with the search frame or the video data of the search frame in a suitable manner such as a time stamp so that when the metadata search file is searched, for example by workstation 24, the results can be displayed to a user on a display. A user may search each DVR and storage device in the network separately so that the searching scales easily as a surveillance system grows. Accordingly, there could be many smaller databases running in parallel. This works well in this type of system because the searches can run independently from each other and splitting databases lets the system scale easily.

Alternatively, some or all of the metadata search files for the system can be stored in one storage location (e.g., storage 22 or workstation 24). The metadata search file is a binary flat file which can be retrieved and searched quickly. The time stamp associated with the results of the search are used to locate the corresponding video data for display to the user.

Figure 5:
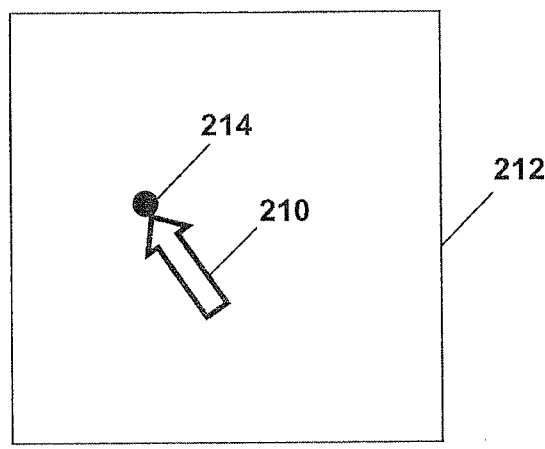
FIG. 5 is a screen shot illustrating one embodiment for inputting search criteria.
Figure 6:
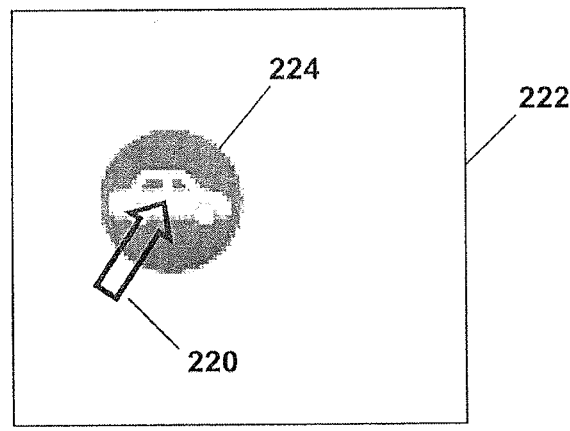
FIG. 6 is a screen shot illustrating one embodiment for inputting search criteria according to some embodiments.
Figure 7:
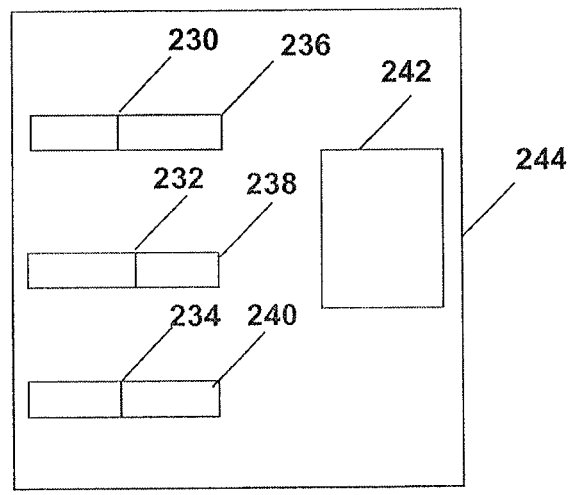
FIG. 7 is a screen shot illustrating one embodiment for inputting search criteria according to some embodiments.

A user can provide input to a workstation concerning a desired search. The search criteria does not have to be an exact search. Rather, the user can provide input, for example, as shown in FIG. 5, by moving a pointer 210 displayed on display 212 to a location 214 in the field of view of a particular camera. Alternatively, as shown in FIG. 6, a user has moved a pointer 220 displayed on display 222 to a particular object 224 in a field of view of a particular camera to indicate a desired color such as the color of object 224 or an object for further search such as object 224. The field of view used by a user can either be a real time field of view or from recorded video. Alternatively, a user can input a search for a desired color by using sliders 230, 232 and 234, respectively on color boxes 236, 238 and 240 which provide varying degrees of color such as for red, green and blue to produce a desired search color in window 242 displayed on display 244 in FIG. 7. The search features in the query by the user can be used to find objects that are similar to the selected object. Alternatively or additionally, the search can be bounded within a user-defined zone and time period. Given a particular rule or set of rules, the search process will retrieve the database to get all the records that are in the search range of the features. The results will be sorted according to the similarity of the object features. The features to be queried can be the range of color, location, speed, object size, aspect ratio, object type, events and so forth. The user can set one or more detection zones in the scene and use rule logic to define the output results.

The search criteria required by a user's query may be as simple as locating an object at a particular location or may encompass many different attributes, such as location, size, color, particular movement and so forth. The following is an example of where a user is interested in finding an object located at a particular location. For coding location for an object (x, y coordinates), the coordinates can range from 0-255 in x and y, that is 8-bit values. If the search is for an object located at 100, 200 (towards the upper middle of the scene), the search could specify the return of all objects that are located at the exact location of (100, 200). However, this search would probably get very few results, if any, because very few objects would be at exactly the location (100, 200). If an object was at (99,200), the search engine would not get a match. In fact, if the operator were generating a visual query where he clicks on the screen approximately where the object might be as discussed above, that click would be fairly imprecise. Getting an exact match is unlikely. An alternate query could say find all objects such that x is within w/2 and y is within h/2. This would find all objects that fall within a square around the location (q=100, 200). This alternate query is better than trying to get an exact match, but again a visual query is fairly imprecise and the object might be just outside this box and again no match would be generated although it would have been "close enough" to satisfy the search. Opening up the search window would include more matches, but what the user wants is to find everything that is closest to (100,200).

An embodiment for determining the objects that are closest to the search criteria established by a user is as follows:
$x_q$=location in x of the query
$y_q$=location in y of the query
$x_n$=location in x of the nth object in the database
$y_n$=location in y of the nth object in the database
The distance, d, of the query location to any object in the database is calculated as follows:

$$d=\sqrt{(x_n-x_q)^2+(y_n-y_q)^2}$$

If the search process blocks through every record in the database and calculates the distance of every object from the query location and then sorts the results, the object in the database that is closest to the query will be at the top of the list. Using this method does not require the user to specify a range to search around; it just always returns the closest object or it can return a list of the n closest objects to the query location by providing the top n results in the sorted list. Accordingly, this embodiment enables a user to click on a frame with his mouse and thereby request to find any objects that are close to this point.

This same technique can be extended to a more complex search, such as a query for a red car moving across the scene at a high rate of speed after entering a particular driveway. In other words, the user wants all the close matches that correlate color, location, velocity and aspect ratio (for example, cars are wide objects compared to people). Color has three dimensions (y, u, v), location has two dimensions (x,y), velocity has two dimensions (u, v), and aspect ratio has one dimension. Therefore, the search method needs to match across eight dimensions in the query. The distance in eight-dimensional space is calculated using the equation below which shows for example an equation for calculating 30 separate parameters.)

$$d=\sqrt{(x_1-q_q)^2+(x_2-q_2)^2+\ldots+(x_n+q_n)^2}$$

In general, a user-generated query will probably not be very precise, which is exactly why this search embodiment is extremely useful because it provides a fuzzy match in a prioritized list. The user may specify the color by name, for example, light blue, or chose it from a color picker as described above. The other search criteria may allow a user to select a general example for color.

It could be that not all parameters are known for the query or not fully known. For example, the user may only know he is looking for a light colored car (pay more attention to luminance Y and none to u and v, the chromaticity). The location of the object may only be known to be in the upper half of the scene (pay attention to the y component of location and less to the x component). Accordingly, an embodiment of a search method to weight the importance of the various query components may be desired by a user; this embodiment is calculated as follows:

$$d=\sqrt{\Sigma_{i=1}^{i=n}w_i(x_i-q_i)^2}$$

where n is the number of dimensions for each object, $w_i$ is the weighting factor for each component, $q_i$ is the component value for the dimension of the query and $x_i$ is the component value for the $i^{th}$ dimension of an object in the database.

A query is run through all objects in a database and finds the minimum value of d for the closest match. It could also find some number of the lowest values of d and present those results to the user for a visual confirmation. Since standard relational databases do not perform this type of mathematical query, the method needs to check the distance of every record against the target query. This type of calculation is fairly easy for modern CPUs to compute with the capability of searching millions of records per second. This would allow this embodiment of the search method to perform ad hoc queries in just a few seconds on every channel of a 48-channel digital video recorder.

Figure 8:
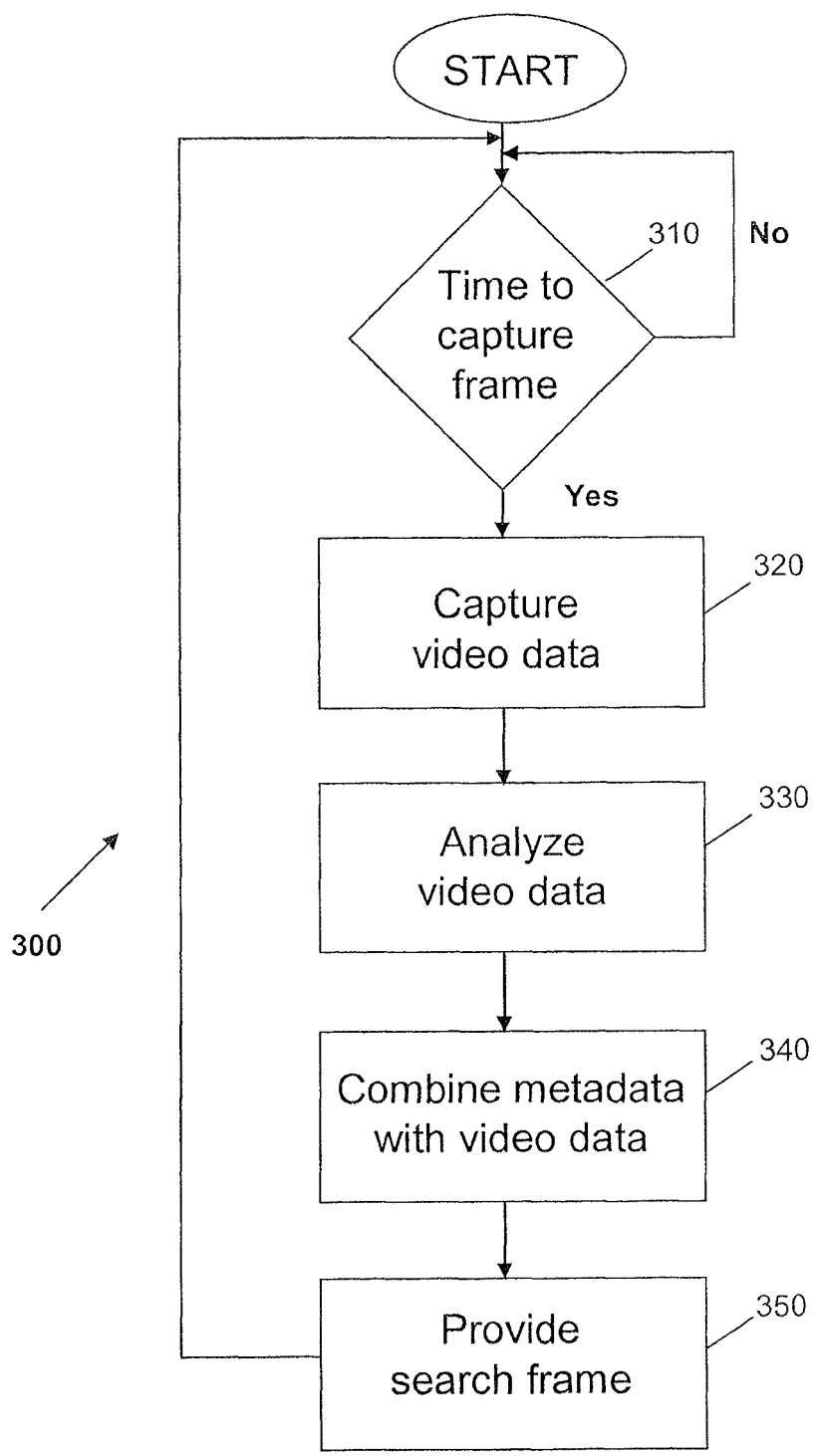
FIG. 8 is a process for capturing and preparing a frame for database searching.

Referring to FIG. 8 process 300 for capturing and preparing a frame for database searching includes the blocks shown. Process 300 is, however, an example only and not limiting. Process 300 can be altered, e.g., by having stages added, removed, rearranged, combined, and/or performed concurrently. Moreover, process 300 can occur in real-time as video frames are captured. At block 310 a decision is made as to whether it is time to capture a frame. The predetermined time between frame captures can be set at any desired interval, such as every half second. If the allotted time has passed, the video data for the frame is captured at block 320. This video data is then analyzed according to the rules set up for the particular camera at block 330. At block 340 the metadata created from the analysis is combined with the video data, and at block 350 the database search frame from process 300 is provided to, for example, a network, directly to a DVR or a workstation, or recorded onto suitable media such as by a DVD writer for future analysis.

Figure 9:
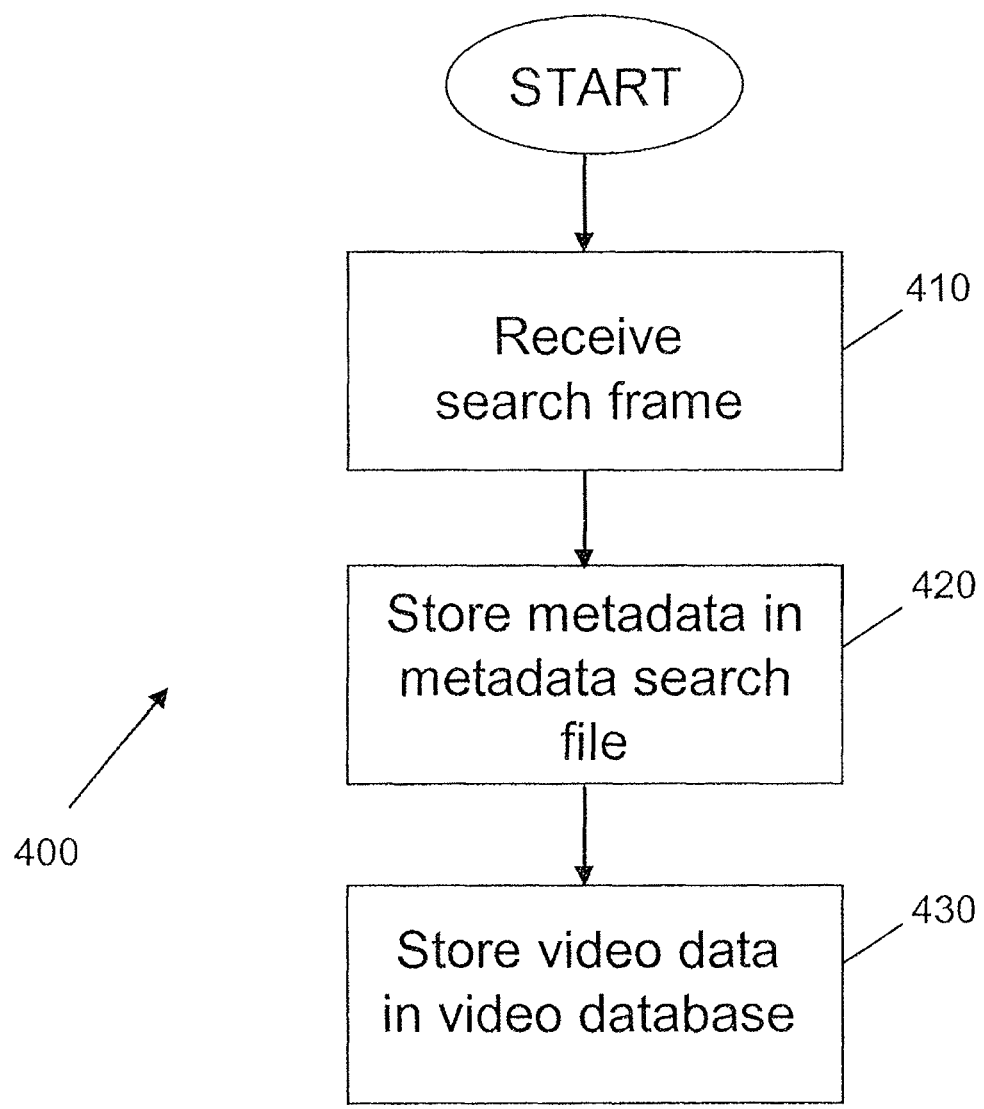
FIG. 9 is a process for receiving a search frame and preparing it for searching according to some embodiments

Referring to FIG. 9, process 400 for receiving and processing a search frame for later searching includes the blocks shown. Process 400 is, however, an example only and not limiting. Process 400 can be altered, e.g., by having stages added, removed, rearranged, combined, and/or performed concurrently. At block 410 the search frame is received, for example, from network 18 by DVR 20. At block 420 the metadata from the search frame is stored in a metadata search file for later searching by, for example, workstation 24. The video data associated with this search frame can then be stored at block 430. In some embodiments, the vide data can be stored separately from the metadata search file or in combination with video data.

Figure 10:
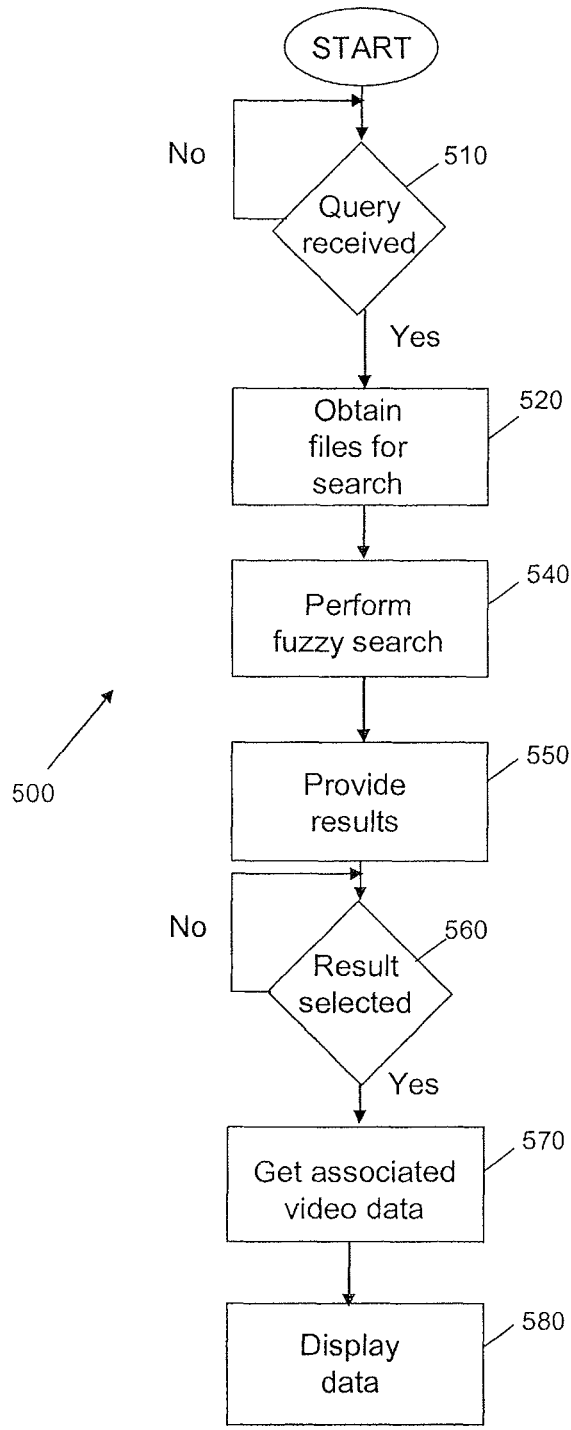
FIG. 10 is a process for performing a search requested by a user according to some embodiments.

Referring to FIG. 10 process 500 for performing a search requested by a user includes the blocks shown. Process 500 is, however, an example only and not limiting. Process 500 can be altered, e.g., by having stages added, removed, rearranged, combined, and/or performed concurrently. At block 510 process 500 waits for a query from a user. When a query is received, the appropriate files are obtained for search at block 520. The appropriate files obtained by workstation 24 can be stored, for example, at DVR 20. At block 540, a fuzzy search is performed according to the equations discussed above for multidimensional searching according to the criteria provided by a user. The results of the search are provided to the user on, for example, display 36 at block 550. Process 500 then waits at block 560 for the user to select one or more of the listed entries in the search result. When the user selects a result entry, process 500 then retrieves the video data associated with that entry at block 570 and then displays it at block 580 on display 36 for the user to view.

Besides the query functions, the forensic search method is able to generate statistic reports for a designated time period to show what kinds of events have happened during the period and the number of the events. For each event, a specific breakdown can be given if required. For example, a report of people-counting can be given in five-minute intervals for the past day. A video summary can also be generated from the metadata and corresponding video content to extract objects from the video and paste them together to generate a video summary in a single image.

Figure 11:
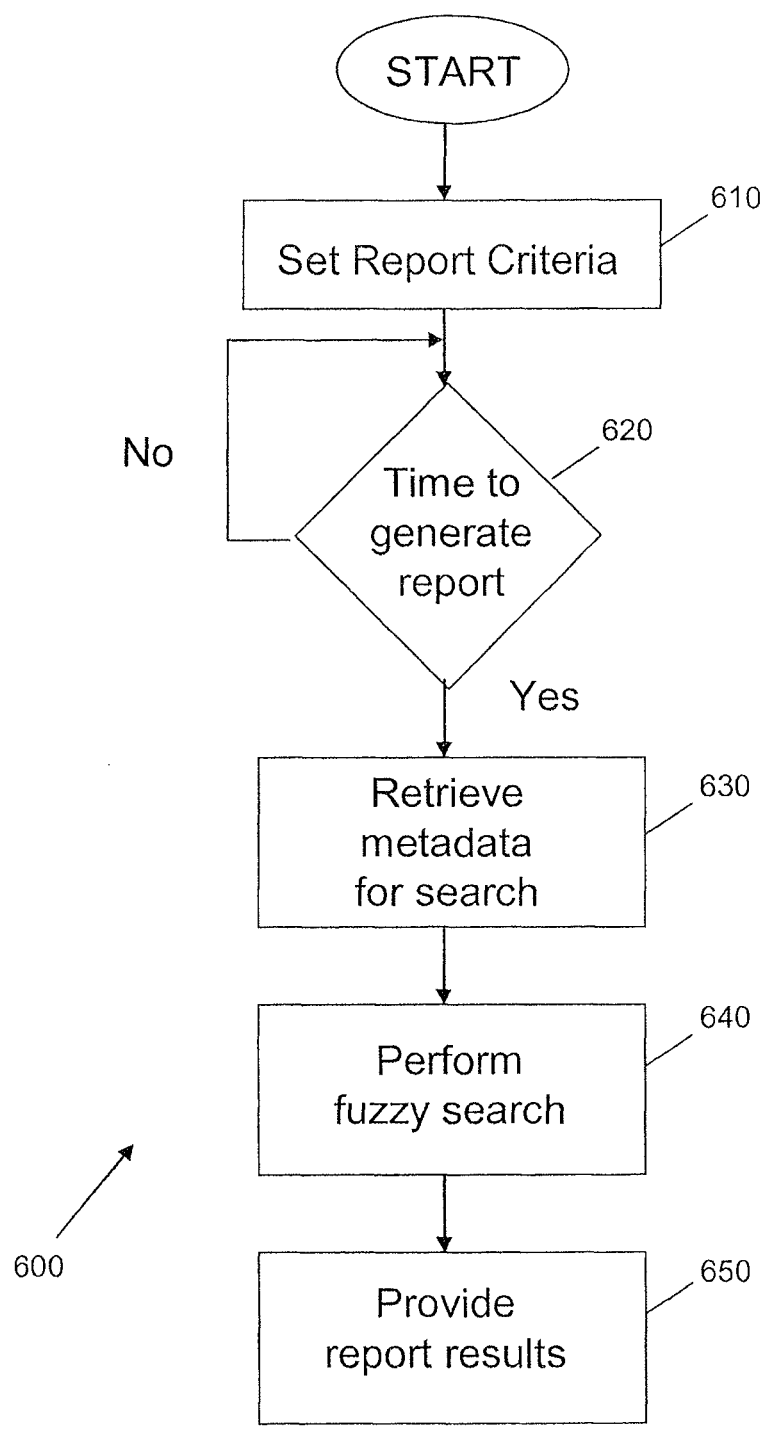
FIG. 11 is a process for generating reports based on requested searches according to some embodiments.

Referring to FIG. 11, process 600 for generating reports based on requested searches can include the blocks shown. Process 600 is, however, an example only and not limiting. Process 600 can be altered, e.g., by having stages added, removed, rearranged, combined, and/or performed concurrently. At block 610, the search report criteria is set by a user. Process 600 then determines at decision point 620 whether it is time to generate the report according to the timeframe specified by the user. Then when the appropriate period of time has passed, such as 24 hours for a report generated once per day, process 600 retrieves the metadata for the search at block 630, performs the fuzzy search at 640 and provides the report results at block 650.

Other examples and implementations are within the scope and spirit of the disclosure and appended claims. For example, due to the nature of software, functions, flowcharts, and processes described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The processes and methods described and shown herein can be stored on a computer-readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

Although the various embodiments discussed herein have pertained to a video surveillance system, the same processes and methods can be utilized with video data captured by commercial and noncommercial individuals outside of the surveillance environment. For example, the search files can be created by a consumer camera. These files could then be downloaded directly to a personal computer or onto a solid state memory device, magnetic tape, disk or other storage device which would then be downloaded to the personal computer at a time selected by the consumer. The searching process described herein could reside on the personal computer for analyzing the video in the same manner as described in relation to a video surveillance system thereby enabling a user to find the video of interest without viewing hours of video data.

Furthermore, more than one invention may be disclosed.

What is claimed is:

1. A method for creating metadata associated with a video frame, the method comprising:
   receiving a video frame;
   developing a background model for the video frame;
   separating a foreground object from the video frame using the background model and a ground plane model;
   detecting and removing reflections from the video frame responsive to a ratio, of a number of pixels associated with the foreground to a number of pixels associated with the video frame, exceeding a threshold, wherein detecting the reflections comprises
      generating a difference image by subtracting an intensity of the video frame from a background image,
      generating a histogram of the difference image, and
      determining that a reflection is present responsive to a maximum of the histogram being shifted from zero by more than a threshold amount;
   classifying the foreground object into a classification; and
   recording the classification of the foreground object in metadata.

2. The method according to claim 1, wherein background model comprises a short-term background model.

3. The method according to claim 2, wherein background model further comprises a long-term background model used in conjunction with the short-term background model.

4. The method according to claim 1, wherein background model comprises a long-term background model.

5. The method according to claim 1 further comprising detecting and removing shadows from an image frame.

6. The method according to claim 1 further comprising:
   detecting an event associated with the foreground object; and
   recording the event in metadata.

7. The method according to claim 6, wherein the foreground object is classified by one or more of object size or object type.

8. The method according to claim 6, wherein the detected event is an event selected from the group consisting of the foreground object entering a frame, the foreground object leaving the frame, camera sabotage, the foreground object holding still, the foreground object merging with another object, the foreground object splitting into two objects, the foreground object entering a zone, the foreground object leaving a zone, the foreground object crossing a tripwire, the foreground object being removed, the foreground object being abandoned, object counting, object loitering, and object timer.

9. The method according to claim 1, wherein the method occurs at a video camera.

10. The method according to claim 1, wherein the foreground object is further classified by object type.

11. The method according to claim 1, wherein the foreground object is further classified by object velocity.

12. The method according to claim 1, wherein the background model is constructed using a probability Gaussian model.

13. The method according to claim 1, wherein separating the foreground object from the video frame comprises subtracting the background model from the video frame to return a foreground object.

14. The method according to claim 1, wherein the classification data associated with the foreground object are recorded as metadata separate from the video data.

15. A method for creating metadata about a video frame, the method comprising:
receiving a video frame;
developing a background model for the video frame;
separating a foreground object from the video frame using the background model and a ground plane model;
detecting and removing reflections from the video frame responsive to ratio, of a number of pixels associated with the foreground to a number of pixel associated with the video frame, exceeding a threshold, wherein detecting the reflections comprises
generating a difference image by subtracting an intensity of the video frame from a background image,
generating a histogram of the difference image, and
determining that a reflection is present responsive to a maximum of the histogram being shifted from zero by more than a threshold amount;
identifying the foreground object as a previously identified foreground object;
classifying the foreground object into a classification based on characteristics of the foreground object; and
recording the classification of the object in metadata.

16. The method according to claim 15, wherein the video frame comprises a plurality of video frames.

17. The method according to claim 15, wherein the identifying the foreground object includes tracking the foreground object from previous video frames.

18. The method according to claim 15 further comprising determining an event of the foreground object.

19. The method according to claim 18, wherein the event is determined based at least in part on the classification of the foreground object.

20. The method according to claim 18, wherein the event is determined based at least in part on a change in the classification of the foreground object from a classification of the foreground object in a previous frame.

21. The method according to claim 18 further comprising detecting and removing shadows from an image frame.

22. A video camera system comprising:
a video camera for capturing video data of a scene and outputting the video data as digital data;
a processor communicatively coupled to the camera, wherein the processor is configured to
receive video data from the video camera,
develop a background model for the video data,
separate a foreground object from the video data using the background model and a ground plane model,
detect and remove reflections from the video frame responsive to ratio, of a number of pixels associated with the foreground to a number of pixel associated with the video frame, exceeding a threshold, wherein to detect the reflections the processor is configured to
generate a difference image by subtracting an intensity of the video frame from a background image,
generate a histogram of the difference image, and
determine that a reflection is present responsive to a maximum of the histogram being shifted from zero by more than a threshold amount,
identify the foreground object's location within the video scene of the video data,
determine the foreground object's color,
classify the foreground object,
record the foreground object's location and color in metadata; and
an output port communicatively coupled to the processor and configured to output the metadata.

23. The video camera system according to claim 22, wherein background model comprises a short-term background model.

24. The video camera system according to claim 23, wherein background model further comprises a long-term background model used in conjunction with the short-term background model.

25. The video camera system according to claim 22, wherein background model comprises a long-term background model.

26. The video camera system according to claim 22, wherein the output port is configured to output the video data separate from the metadata.

27. The video camera system according to claim 22, wherein the processor is further configured to compress the video data according to a video compression algorithm.

28. The video camera system according to claim 22, wherein the processor is further configured to determine the speed of the foreground object and record the speed of the foreground object in metadata.

29. The video camera system according to claim 22, wherein the processor is further configured to determine an aspect ratio of the foreground object and record the aspect ratio of the foreground object in metadata, and wherein the processor is further configured to classify the foreground object based further on the aspect ratio of the foreground object.

30. A video processing system comprising:
a video input port configured to receive video data;
a processor communicatively coupled to the video input port and configured to:
develop a background model for the video data,
separate a foreground object from the video data using the background model and a ground plane model,
detect and remove reflections from the video frame responsive to ratio, of a number of pixels associated with the foreground to a number of pixel associated with the video frame, exceeding a threshold, wherein to detect the reflections the processor is configured to
generate a difference image by subtracting an intensity of the video frame from a background image,
generate a histogram of the difference image, and
determine that a reflection is present responsive to a maximum of the histogram being shifted from zero by more than a threshold amount,
determine a relative location of the foreground object, determine a relative color of the foreground object, and classify the foreground object; and a video output port communicatively coupled to the processor and configured to output the relative location and the relative color of the foreground object as metadata.

31. The video processing system according to claim 30, wherein the output port is configured to output the video data separate from the metadata.

32. The method of claim 1, wherein separating the foreground object from the video frame using the background model and the ground plane model comprises:

determining a normalized size of a grouped set of pixels in the video frame using the ground plane model; and classifying the grouped set of pixels as the foreground object if the normalized size of the grouped set of pixels falls within a predetermined range.

33. The method of claim 1, wherein the classification characterizes the foreground object based on an object color, an aspect ratio, and a position.

34. The method of claim 32, wherein the normalized size of the grouped of pixels is determined based on a position of the grouped set of pixels relative to a vanishing point associated with the ground plane model.

* * * * *